(12) United States Patent
Sinha et al.

(10) Patent No.: US 6,931,372 B1
(45) Date of Patent: Aug. 16, 2005

(54) JOINT MULTIPLE PROGRAM CODING FOR DIGITAL AUDIO BROADCASTING AND OTHER APPLICATIONS

(75) Inventors: Deepen Sinha, Chatham, NJ (US); Carl-Erik Wilhelm Sundberg, Chatham, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/238,136

(22) Filed: Jan. 27, 1999

(51) Int. Cl.[7] .............................. G10L 3/02; G10L 19/02
(52) U.S. Cl. ....................... 704/229; 704/500; 704/503
(58) Field of Search .............................. 707/229, 227, 707/226, 222, 219, 214, 200.1; 381/2; 375/253, 225, 240.3; 370/389

(56) References Cited

U.S. PATENT DOCUMENTS

| | | | |
|---|---|---|---|
| 5,463,641 A | | 10/1995 | Dorward et al. |
| 5,488,665 A | * | 1/1996 | Johnston et al. ............... 381/2 |
| 5,621,855 A | | 4/1997 | Veldhuis et al. |
| 5,909,467 A | * | 6/1999 | Tae ............................. 375/253 |
| 5,956,674 A | * | 9/1999 | Smyth et al. ............ 704/200.1 |
| 6,128,593 A | * | 10/2000 | Hu ............................. 704/229 |
| 6,424,939 B1 | * | 7/2002 | Herre et al. ................. 704/219 |

FOREIGN PATENT DOCUMENTS

| | | |
|---|---|---|
| EP | 0 530 916 A2 | 3/1993 |
| JP | 04-360331 | 12/1992 |
| JP | 05-227039 | 9/1993 |

OTHER PUBLICATIONS

Srinivasan et al., "High–Quality Audio Compression Using an Adaptive Wavelet Packet Decompostion and Psychoacoustic Modeling," IEEE Transactions on Siganl Processing, vol. 46, No. 4, Apr. 1998.*

D. Sinha, J.D. Johnston, S. Dorward and S.R. Quackenbush, "The Perceptual Audio Coder," in Digital Audio, Section 42, pp. 42–1 to 42–18, CRC Press, 1998.

(Continued)

*Primary Examiner*—Richemond Dorvil
*Assistant Examiner*—V. Paul Harper

(57) ABSTRACT

The invention provides methods and apparatus for processing information, e.g., audio, video or image information, for transmission in a communication system. In an illustrative embodiment, a joint multiple program coder determines the value of a single-bit or multiple-bit criticality measure, e.g., criticality flag, in a designated interval, e.g., the duration of an audio frame, for each of the programs in a set of multiple programs to be transmitted in the system. The joint multiple program coder allocates a pool of available bits to the programs based at least in part on the determined values of the criticality measures, such that a program with a higher-valued criticality measure in the designated time interval is allocated a greater percentage of the available bits for that interval than another one of the programs with a lower-valued criticality measure. The joint multiple program coder repeats the determination and allocation operations for each of a number of time intervals, e.g., frames, such that the bit allocation can vary from interval to interval.

20 Claims, 2 Drawing Sheets

OTHER PUBLICATIONS

N.S. Jayant and E.Y. Chen, "Audio Compression: Technology and Applications," AT&T Technical Journal, pp. 23–34, vol. 74, No. 2, Mar.–Apr. 1995.

J. Hagenauer, "Rate Compatible Punctured Convolutional Codes (RCPC Codes) and their Applications," IEEE Transactions on Communications, vol. 36, No. 4, pp. 389–400, Apr. 1988.

J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

R.V. Cox et al., "Sub–band Speech Coding and Matched Convolutional Channel Coding for Mobile Radio Channels," IEEE Transactions on Acoustics, Speech and Signal Processing, vol. 39, No. 8, pp. 1717–1731, Aug. 1991.

A.R. Calderbank and N. Seshadri, "Multilevel Codes for Unequal Error Protection," IEEE Transactions on Information Theory, vol. 39, No. 4, pp. 1234–1248, Jul. 1993.

C.–E.W. Sundberg, "Digital Audio Broadcasting in the FM Band," Proceedings of the IEEE Symposium on Industrial Electronics, Portugal, Jul. 7–11, 1997.

C.–E.W. Sundberg, "Digital Audio Broadcasting: An Overview of Some Recent Activities in the U.S.," Proceedings of Norsig–97, Norwegian Signal Processing Symposium, Tromso, Norway, May 23–24, 1997.

B.W. Kroeger and A.J. Vigil, "Improved IBOC DAB Technology for AM and FM Broadcasting," SBE Engineering Conference, pp. 1–10, 1996.

B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.

B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.

* cited by examiner

JOINT MULTIPLE PROGRAM CODING FOR DIGITAL AUDIO BROADCASTING AND OTHER APPLICATIONS

RELATED APPLICATION

The present application is related to U.S. patent application Ser. No. 09/238,137 entitled "Multiple Program Decoding for Digital Audio Broadcasting and Other Applications," and U.S. patent application Ser. No. 09/238,138 entitled "Joint Multiple Program Error Concealment for Digital Audio Broadcasting and Other Applications," both filed concurrently herewith in the name of inventors Deepen Sinha and Carl-Erik W. Sundberg.

FIELD OF THE INVENTION

The present invention relates generally to digital audio broadcasting (DAB) and other techniques for transmitting information, and more particularly to techniques for providing joint multiple program coding and bitstream formatting for DAB and other applications.

BACKGROUND OF THE INVENTION

Perceptual audio coding devices, such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein, perform audio coding using a noise allocation strategy whereby for each audio frame the bit requirement is computed based on a psychoacoustic model. PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel).

PAC encoding as described in the above-cited reference may be viewed as a perceptually-driven adaptive filter bank or transform coding algorithm. It incorporates advanced signal processing and psychoacoustic modeling techniques to achieve a high level of signal compression. In brief, PAC encoding uses a signal adaptive switched filter bank which switches between a Modified Discrete Cosine Transform (MDCT) and a wavelet transform to obtain compact description of the audio signal. The filter bank output is quantized using non-uniform vector quantizers. For the purpose of quantization, the filter bank outputs are grouped into so-called "codebands" so that quantizer parameters, e.g., quantizer step sizes, are independently chosen for each codeband. These step sizes are generated in accordance with a psychoacoustic model. Quantized coefficients are further compressed using an adaptive Huffman coding technique. PAC employs a total of 15 different codebooks, and for each codeband, the best codebook may be chosen independently. For stereo and multichannel audio material, sum/difference or other form of multichannel combinations may be encoded.

PAC encoding formats the compressed audio information into a packetized bitstream using a block sampling algorithm. At a 44.1 kHz sampling rate, each packet corresponds to 1024 input samples from each channel, regardless of the number of channels. The Huffman encoded filter bank outputs, codebook selection, quantizers and channel combination information for one 1024 sample block are arranged in a single packet. Although the size of the packet corresponding to each 1024 input audio sample block is variable, a long-term constant average packet length may be maintained as will be described below.

Depending on the application, various additional information may be added to the first frame or to every frame. For unreliable transmission channels, such as those in DAB applications, a header is added to each frame. This header contains critical PAC packet synchronization information for error recovery and may also contain other useful information such as sample rate, transmission bit rate, audio coding modes, etc. The critical control information is further protected by repeating it in two consecutive packets.

It is clear from the above description that the PAC bit demand is derived primarily by the quantizer step sizes, as determined in accordance with the psychoacoustic model. However, due to the use of Huffman coding, it is generally not possible to predict the precise bit demand in advance, i.e., prior to the quantization and Huffman coding steps, and the bit demand varies from frame to frame. Conventional PAC encoders therefore utilize a buffering mechanism and a rate loop to meet long-term bit rate constraints. The size of the buffer in the buffering mechanism is determined by the allowable system delay.

In conventional single program PAC bit allocation, the encoder makes a request for allocating a certain number of bits for a particular audio frame to a buffer control mechanism. Depending upon the state of the buffer and the average bit rate, the buffer control mechanism then returns the maximum number of bits which can actually be allocated to the current frame. It should be noted that this bit assignment can be significantly lower than the initial bit allocation request. This indicates that it is not possible to encode the current frame at an accuracy level for perceptually transparent coding, i.e., as implied by the initial psychoacoustic model step sizes. It is the function of the rate loop to adjust the step sizes so that bit demand with the modified step sizes is below, and close to, the actual bit allocation. The rate loop operates based on psychoacoustic principles to minimize the perception of excess noise. However, a substantial amount of undercoding, i.e., a noise allocation higher than that suggested by the psychoacoustic model, may be necessary to meet the rate constraints. The undercoding can lead to audible artifacts in the decoded audio output and is particularly noticeable at lower bit rates and for certain types of signals.

Perceptual audio coding techniques such as PAC encoding are particularly attractive for FM band and AM band transmission applications such as in-band digital audio broadcasting (DAB) systems, which are also known as hybrid in-band on-channel (HIBOC), all-digital IBOC and in-band adjacent channel (IBAC)/in-band reserve channel (IBRC) DAB systems. Perceptual audio coding techniques are also well suited for use in other applications, such as satellite DAB systems and Internet DAB systems. Although PAC and other conventional audio coding techniques often provide adequate performance in single program DAB transmission applications, improvements are needed for multiple program transmission applications, e.g., multiple-program DAB, satellite DAB, Internet DAB, and other types of multiple program transmission.

SUMMARY OF THE INVENTION

The present invention provides methods and apparatus for implementing joint coding in multiple program transmission applications, such as multiple program DAB. In an illustrative embodiment of the invention, a joint multiple program coder determines a value of a criticality measure, e.g., a value of a criticality flag, in a designated time interval for a portion of a bitstream from each of a set of N programs, e.g., audio programs. The joint multiple program coder allocates a pool of available bits to the programs based at least in part on the determined values of the criticality measures, such that a program with a higher-valued criticality measure in the designated time interval is allocated a greater percentage of the available bits for that interval than another one of the programs with a lower-valued criticality measure. The invention thus ensures that the programs with the highest-valued criticality measures in the given time interval are allocated the largest percentages of the available bits. The process is repeated for each of a number of intervals, e.g., audio frames, such that the allocation can vary from interval to interval. The joint multiple program coder encodes a portion of each of the programs during a given interval in accordance with the resulting bit allocation to generate a set of encoded bitstreams, which are then further encoded using an outer code, e.g., a CRC code, RS code, BCH code, or other linear block code, and an inner code, e.g., a convolutional code, turbo code, or trellis coded modulation.

The invention may be implemented in numerous applications, such as simultaneous multiple program listening and/or recording, simultaneous delivery of audio and data, etc. In addition, the invention can be applied to other types of digital information, including, for example, data, video and image information. Alternative embodiments of the invention can utilize other types of outer codes, other types of inner codes, other types of interleaving, e.g., block interleaving, convolutional interleaving or random interleaving, and a wide variety of different frame formats, including TDM, FDM or CDM frame formats, as well as combinations of these and other formats. Moreover, the invention is applicable not only to perceptual coders but also to other types of source encoders using other compression techniques operating over a wide range of bit rates, and can be used with transmission channels other than radio broadcasting channels.

DETAILED DESCRIPTION OF THE INVENTION

Figure 1:
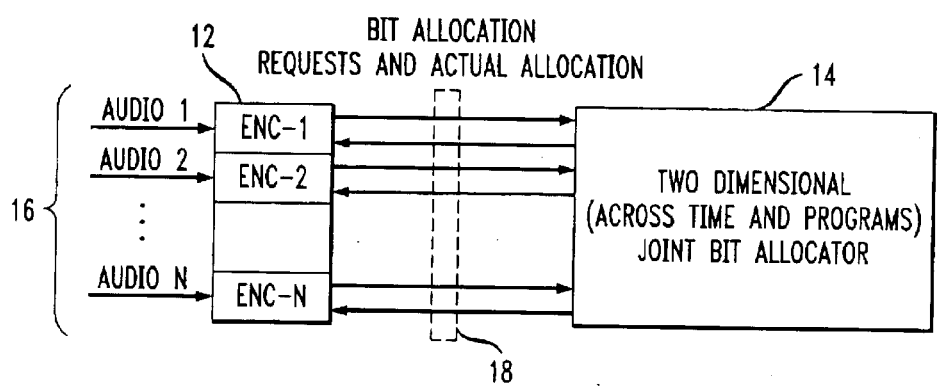
FIG. 1 shows an illustrative embodiment of a joint multiple program audio coder in accordance with the invention.

The invention will be described below in conjunction with exemplary joint multiple program coding techniques for use in the transmission of audio information bits, e.g., audio bits generated by an audio coder such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998. It should be understood, however, that the joint multiple program coding techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems. The term "channel" as used herein is also intended to include a storage channels, e.g., a memory or other storage device, or a designated portion of such a device. The invention can thus also be applied to information storage applications, e.g., the storage of multiple programs using noisy storage channels. The term "program" as used herein is intended to include any type of information signal, such as, for example, a given channel or other grouping of audio, video, data or other information, as well as portions or combinations of such channels or groupings. The term "criticality measure" as used herein refers generally to any bit requirement indicator associated with a given signal, or portion thereof, to be coded. The values of a criticality measure at a given point in time thus indicates the bit requirements associated with coding the corresponding signal or signal portion. A criticality flag is an example of one particular type of criticality measure.

In an audio program, transients or onsets typically represent the most critical information in terms of coding severity and bit demand. For onsets, the bit demand may be substantially larger than normal, particularly for subband coding schemes, and these are also most susceptible to coding artifacts. Experience with PAC encoding at 64 kbps stereo indicates that distortions in the onsets represent the most audible artifact of the coding process. In PAC encoding, the presence of onsets in an audio frame is indicated using a criticality flag. In its simplest form, the criticality flag is a single-bit binary flag indicating the presence or absence of onsets. A continuous or multi-bit value may also be used, in which case intermediate values of the criticality flag, e.g., between 0.0 and 1.0, represent the relative richness of a non-onset audio segment. For example, the intermediate values of the criticality flag may be higher if there are transients or other higher harmonic contents in the segment.

FIG. 1 shows a joint multiple program audio coder 10 in accordance with an illustrative embodiment of the invention. The coder 10 includes a PAC encoder bank 12 which is comprised of N PAC audio coders ENC-1, ENC-2, . . . ENC-N, and a two-dimensional joint bit allocator 14. A set of input audio signals 16, including audio programs designated Audio 1, Audio 2, . . . Audio N, are supplied to PAC encoders ENC-1, ENC-2, . . . ENC-N, respectively, in the PAC encoder bank 12. The set of N audio programs are also referred to herein as a "cluster" of programs. The cluster of N audio programs may be a subset of a total number $N_T$ of programs to be transmitted in a given system, i.e., $1 \leq N \leq N_T$. The remaining $N_T-N$ programs, if any, may include, e.g., data programs that are not included in the joint audio coding operation. The joint bit allocator 14 allocates a common pool of available bits for a given time interval among the N audio programs, using techniques which will be described in greater detail below. This allows larger percentages of the available bits to be allocated to the more demanding audio programs, on a substantially instantaneous basis.

Bit allocation requests are sent by the encoders ENC-1, ENC-2, . . . ENC-N to the joint bit allocator 14, and the joint bit allocator 14 responds with actual bit allocations. Element 18 represents the bit allocation requests and actual allocations. In a typical implementation, the value of N may be on the order of 20 to 25, although other values could of course be used. As noted previously, an N-program cluster may represent, e.g., all of the audio programs in a given set of $N_T$ programs to be transmitted in a communication system, or a designated subset of the given set of $N_T$ programs. In the latter case, the particular programs in the subset may vary, e.g., as a function of time.

The basic operation of the joint bit allocator 14 is as follows:

1. At fixed time intervals, e.g., every $T_f$ msecs where $T_f$ is the frame duration, typically 22 msec in PAC encoding, a bit allocation request is made by each participating program encoder ENC-1, ENC-2, . . . ENC-N in PAC encoder bank 12 to the joint bit allocator 14. The bit allocation request from a given one of the N programs, i.e., the ith program where i=1,2, . . . N, may be comprised of two components: (i) actual bit demand for perceptual coding of the audio information of the ith program in the $T_f$ time interval; and (ii) a criticality measure $C_f(i)$, e.g., single-bit or multi-bit criticality flag, indicating the criticality of the audio information of the ith program in the $T_f$ time interval. As noted above, in the case of audio programs, criticality may reflect the presence of certain critical features in the audio, such as onsets, transients or harmonics, or of a general characteristic or other quality, such as contribution to "richness" of the audio. As another example, the criticality measure $C_f(i)$ may be a linear criticality flag providing a number characterizing a designated quality of the corresponding program. Such a linear criticality flag will generally utilize multiple bits to provide a range of measures of criticality for a portion of an audio program.

2. The joint bit allocator 14 considers several factors in jointly processing the bit allocation requests from the individual program encoders. These factors include current and past bit allocation requests from the program encoders, average rate for a particular program, and allowable system delay, e.g., due to source coding and decoding. The outcome of the allocator processing is a bit rate assignment for each of the N programs for the current time interval. These assignments are then fed back to the individual program encoders ENC-1, ENC-2, . . . ENC-N.

3. Each program encoder operates its rate loop mechanism to maintain the bit rate requirement at or below the actual bit assignment. Because of imprecise control over the bit demand (due to Huffman coding), a given program encoder may still have some unused bit capacity (almost always less than 50 bits, typically 10–25 bits). This excess capacity may be used for auxiliary data, e.g., program associated data, and may be on the order of 500–1500 bps. Theoretically, it is also possible to return unused capacity to the joint bit allocator for future use. However, this will generally result in added complexity without significant additional joint coding gains.

Figure 2:
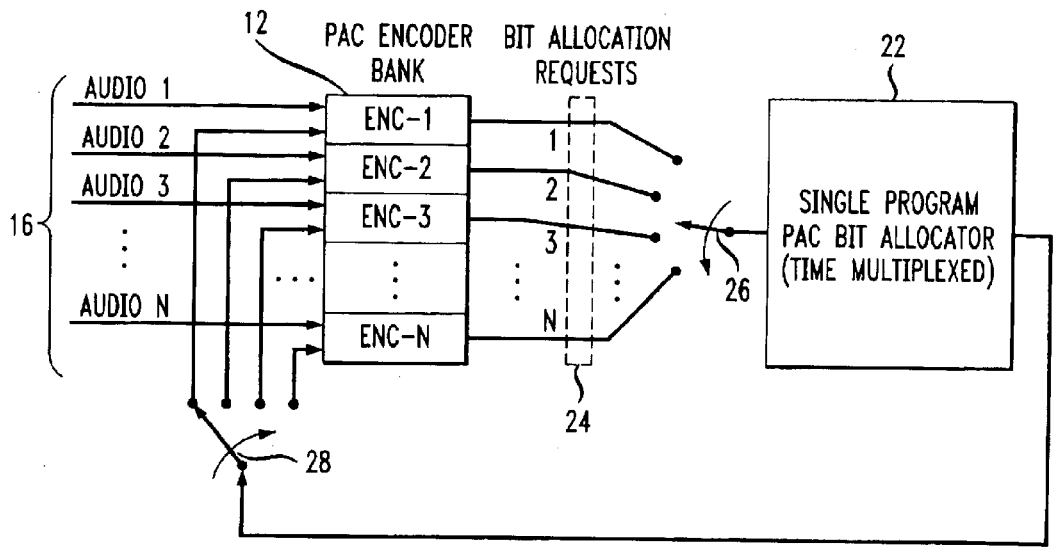
FIG. 2 shows an alternative embodiment of a joint multiple program audio coder in accordance with the invention.

It should be noted that, as an alternative to the two-dimensional joint coding illustrated in FIG. 1, the above-noted conventional single program PAC bit allocation may be extended to N audio programs. FIG. 2 shows an alternative joint multiple program encoder 20 in accordance with the invention. The encoder 20 includes the PAC encoder bank 12 driven by the set of N audio program inputs 16 as previously described, and a conventional single program PAC bit allocator 22. The bit allocator 22 is one-dimensional, i.e., operates over the time dimension only. A set of N bit allocation requests 24 from the PAC encoders ENC-1, ENC-2, . . . ENC-N are sampled by switch 26 and delivered serially to the single program allocator 22. Bit allocations from the single program bit allocator 22 are delivered serially via switch 28 to the appropriate encoders. The joint encoder essentially time multiplexes the single program bit allocator 22 among the N audio programs. This alternative joint multiple program encoder requires a considerably longer system delay, i.e., N times the system delay associated with a single program encoder, in order to provide performance similar to the two-dimensional joint multiple program encoder 10 of FIG. 1. It may therefore be unsuitable for use in applications which are sensitive to long delays.

A joint multiple program audio coding algorithm suitable for use in the illustrative embodiment of FIG. 1 is given below, using C-like pseudocode. For the purpose of this illustrative joint multiple program audio coding algorithm, it is assumed that a three-valued criticality flag $C_F$ is being used: $C_f(i)=0$ indicates stationary low-complexity audio, $C_f(i)=0.5$ indicates stationary higher-complexity audio, and $C_f(i)=1$ indicates an onset or transient segment. Of course, the invention may utilize many other types of criticality measures. This coding algorithm may be implemented by the joint bit allocator 14 of FIG. 1.

```
/*
Processing Algorithm for Multi-Program Bit Allocation
Each cluster contains N program encoders.
For i = 1, . . . , N, the following notation is defined:
   (B_d[i], C_f[i]) is the current bit allocation request, where B_d [i] is the
   current bit demand from the ith program encoder, and
   C_f[i] is a tertiary criticality flag from the ith encoder.
   C_f [i] = 1 most critical, C_f [i] = 0.5 medium critical,
   C_f [i] = 0 not critical
   B_R [i] is the designated bit rate (in bits per T_f msec for the ith program)
   B_a [i] is the actual bit allocation as returned by the encoder.
   ND is the maximum allowable system delay (in units of T_f msec
   audio frames (e.g., 8).
   BRM = Max average bit rate in a cluster (e.g., 64 kbps)
   CRCBLKLEN = Block length for outer code.
*/
#define CRCBLKLEN 240    /* block length for outer code */
#define BRM 1486         /* maximum average bit rate in a cluster */
#define ND 8             /* maximum allowable system delay */
#define N 25             /* number of program channels */
static float AugBitPool;
static float BitPool;
static float MinBitPool;
static float MaxBitPool;
static float MaxBa[N];
void Init (
   float B_R [ ],
   int n                 /* number of channels */
)
{
float x;
int i;
   x = 0.0;
   for (i = 0; i < n; i++) {
      x = x + B_R [i];
      MaxBa[i] = 4.0 * B_R [i];
   }
   BitPool = ND * x;
   MinBitPool = 0.2 * BitPool;
   MaxBitPool = BitPool - CRCBLKLEN * n;
   AugBitPool = x;
} /* end Init */
int JointMultiProgramBitAlloc (
   float B_d[ ],
   float C_f[ ],
   float B_R[ ],
   float B_a[ ],
   int n                 /* number of channels */
```

-continued

```
)
{
    float ExtraBitsCrit;           /* extra bits for critical segments */
    float ExtraBitsSCrit;          /* extra bits for subcritical segments */
    float extrabits;
    float x, y, z;                 /* auxiliary variables */
    float oldalloc;
    int i                          /* loop counter */
    BitPool = BitPool + AugBitPool;
    for (i = 0; i < n; i++) {
        if [C_f [i] == 1.0]
            B_a[i] = B_R [i];
        else
            B_a[i] = 0.9 * B_R [i];
        BitPool = BitPool - B_a[i]
    }
    if (BitPool < MinBitPool) {
        return (0);
    }
    /* if (B_a[i]>1000) printf ("1 B_a=%d", B_a[1]);*/
    /* assign half the bits: 35% to critical, 15% to medium critical */
    ExtraBitsCrit = 0.35 * BitPool;
    ExtraBitsSCrit = 0.15 * BitPool;
    /* normalization to avoid extreme allocations */
    x = y = z = 0.0;
    for (i = 0; i < n; i++) {
        if (C_f [i] = = 1.0) {
            x = x + B_R[i]/BRM;
        }
        else if [C_f [i] = = 0.5] {
            y = y + B_R [i]/BRM;
        }
        /*else*/
        {
            z = z + B_R[i]/BRM;
        }
    }
    ExtraBitsCrit = ExtraBitsCrit / x;
    ExtraBitsScrit = ExtraBitsScrit / y;
    for (i = 0; i < n; i++) {
        if (C_f[i] == 1.0) {
            oldalloc = B_a[i];
            B_a[i] = B_a[i] + (B_R [i]/BRM) * ExtraBitsCrit;
            if (B_a[i] > B_d[i]) {
                B_a[i] = B_d[i];
            }
            if (B_a[i] > MaxBa[i]) {
                B_a[i] = MaxBa[i];
            }
            BitPool = BitPool - [B_a[i] - oldalloc];
        }
        else if (C_f [i] == 0.5) {
            oldalloc = B_a[i]
            B_a[i] = B_a[i] + (B_R [i]/BRM) * ExtraBitsScrit;
            if (B_a[i] > B_d[i]) {
                B_a[i] = B_d[i];
            }
            if (B_a[i] > MaxBa[i]) {
                B_a[i] = MaxBa[i];
            }
            BitPool = BitPool - (B_a[i] - oldalloc);
        }
    }
    if (BitPool > MaxBitPool) {
        extrabits = Bitpool - MaxBitPool;
        Bitpool = MaxBitPool;
    }
    extrabits = extrabits/z;
    for (i = 0; i < n; i++) {
        B_a[i] = B_a[i] + (B_R [i]/BRM) * extrabits;
    }
    /*if (B_a[i] > 10000) printf ("B_a=%d", B_a[1]); */
    /*printf (" B_a[1] = %f\n", B_a[1]); */
} /* End Function */
```

Figure 3:
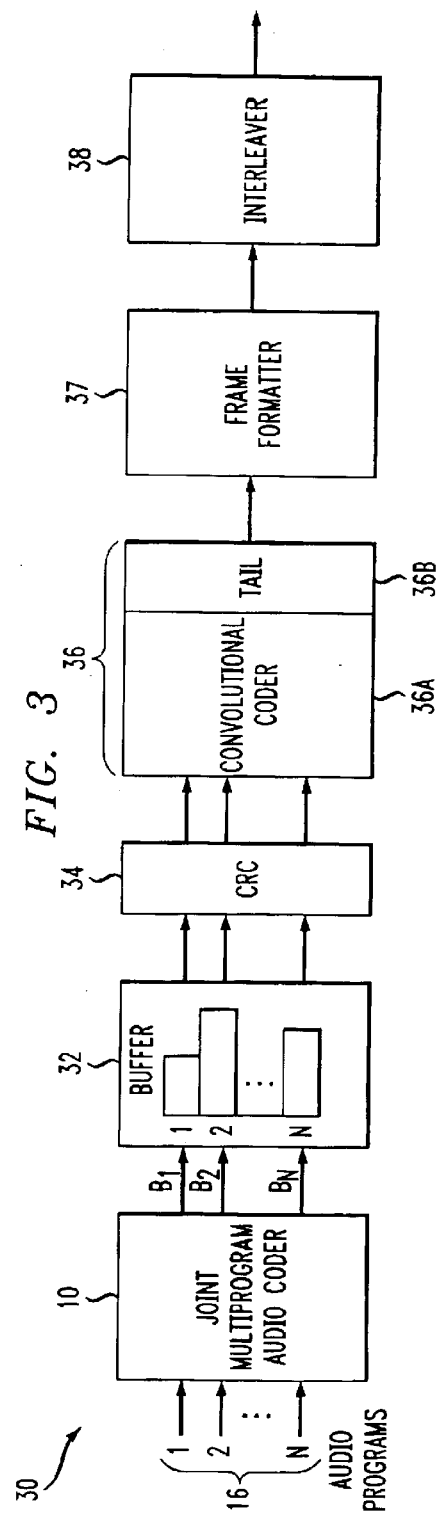
FIG. 3 shows a portion of a transmitter providing joint multiple program audio coding in accordance with an illustrative embodiment of the invention.

FIG. 3 shows a transmitter 30 incorporating the joint multiple program audio coder 10 of FIG. 1. The output of the multiple program coder 10 is a set of N output bitstreams $B_1$, $B_2$, . . . $B_N$. A given output bitstream $B_i$ represents an encoded audio signal, e.g., a sequence of audio packets, generated from the ith audio program. The output bitstreams $B_i$ are delivered to a buffer 32, and cyclic redundancy codes (CRCs) are computed for each of the streams in a CRC device 34. The CRC is an example of one type of "outer code" that may be used in transmitter 40. Other possible outer codes include, e.g., Reed-Solomon (RS) codes, Bose-Chadhuri-Hocquenghem (BCH) codes, and other linear block codes.

In the transmitter 30, the buffer 32 is filled up with CRC frames up to the capacity of a designated fixed length frame, referred to herein as an "F frame," plus a constant overhead. Each program bitstream is then individually convolutionally coded and terminated with a tail inside the F frame, using a convolutional coder bank 36 which includes a set of individual convolutional encoders 36A and a tail generator 36B. As will be described in greater detail below, this separate channel coding allows each program to be decoded with a single, relatively low speed Viterbi decoder, with a known upper bound on its operating bit rate, such that instantaneous tuning is possible for all programs. Although alternative embodiments could utilize joint channel coding over all or a subset of the N programs, this would generally require higher speed Viterbi decoders and more complex deinterleaving. The convolutional coding in coder bank 36 is an example of a type of "inner code" that is used in the transmitter 30. Other types of inner codes may also be used, including block or convolutional codes, so-called "turbo" codes, and coding associated with trellis coded modulation.

Figure 4:
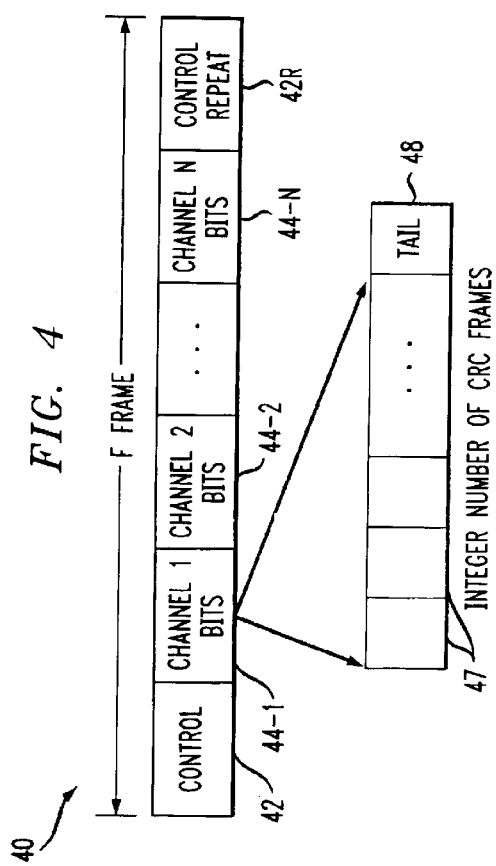
FIG. 4 shows an exemplary frame format for use in the transmitter of FIG. 3.

The transmitter 30 further includes a frame formatter 37 which forms the above-noted F frames from the outputs of the convolutional coder bank 36. Interleaving is done in interleaver 38 over a set of one or more of the fixed-length F frames. FIG. 4 shows an example of an F frame 40 which may be generated by the frame formatter 37 in a time division multiplexed (TDM) format. The F frame 40 includes control information 42, encoded audio data bits 44-1, 44-2, . . . 44-N for the N audio channels, and repeated control information 42R. In this example, each of the sets of encoded audio bits 44-i, i=1, 2, . . . N, includes an integer number of CRC frames 47 and a terminating tail 48. As part of the frame formatting process, the multiple program control information may be repeated, e.g., as repeated control information 42R, and error protected with its own terminated convolutional inner code and its own CRC outer code, such that the control information is provided with a higher level of error protection than the non-control information. The control information may alternatively use the same outer and/or inner codes as the non-control information.

The control information in F frame 40 may include, e.g., an indication of the number of CRC frames for each program, frame synchronization information such as a frame sync word, interleaver synchronization information, subscriber identification/control information, e.g., for a pay radio service, program content information such as rate, type (audio/data/voice), etc., and transmission parameters such as type of audio coding, type of outer and inner channel coding, use of joint multiple program audio coding on all or a subset of a given set of programs, multidescriptive coding, and unequal error protection (UEP). Portions of this control information may change very slowly with system configuration updates and program channel reshuffling, such that the complete set of information does not have to be included in one frame header, but can instead be spread out over a number of F frames.

The transmitter 30 of FIG. 3 will generally include additional processing elements, such as modulators, multiplexers, upconverters and the like, which are not shown in FIG. 3 for simplicity of illustration. In addition, the transmitter may be implemented using elements other than those shown. Moreover, elements of the transmitter 30, such as the joint multiple program audio coder 10, may be implemented at least in part using an application-specific integrated circuit, microprocessor or any other type of digital data processor, as well as portions or combinations of these and other known devices. Elements of the transmitter 30 may also be implemented in the form of one or more software programs executed by a central processing unit (CPU) or the like in computer or other digital data processor.

It should be noted that there is generally a relatively small overhead associated with the above-described joint multiple program audio coding. Each F frame contains at most all the bits in one set of N audio programs interleaved over the maximum interleaver interval. Each audio program may be allowed, for example, a peak average bit rate of 4 times its assigned bit rate, e.g., 4 times 64 kbps. As previously noted, the control information 42, 42R in a given F frame contains the number of CRC frames for each audio program in that F frame. This will generally require at most 16 bits per program, which translates to an overhead of 0.025% in this example, assuming N=20 programs, an F frame duration of 4 seconds, and a 64 kbps assigned bit rate. In this example, the convolutional code for each program is terminated inside each F frame, and the overhead for tail bits is only about 0.003%. If UEP is provided, control bits will be doubled but addition to tail bits may be avoided, e.g., by the use of rate-compatible punctured convolutional (RCPC) codes. The overhead may also be minimal for smaller F frames, e.g., an F frame ¼ the size of the above-described F frame will generally have control/tail overhead which is at most four times the values given above.

The invention may be utilized with UEP techniques such as those described in U.S. patent application Ser. No. 09/022,114, filed Feb. 11, 1998 in the name of inventors Deepen Sinha and Carl-Erik W. Sundberg, and entitled "Unequal Error Protection For Perceptual Audio Coders," and U.S. patent application Ser. No. 09/163,656, filed Sep. 30, 1998 in the name of inventors Deepen Sinha and Carl-Erik W. Sundberg, and entitled "Unequal Error Protection for Digital Broadcasting Using Channel Classification."

Alternative embodiments of the invention can utilize other types of outer codes, e.g., RS, BCH or other linear block codes, other types of inner codes, e.g., various types of convolutional codes, turbo codes, or coding associated with trellis coded modulation, and a variety of different types of interleaving, e.g., block interleaving, convolutional interleaving, or random interleaving. The alternative embodiments could also utilize only an inner code and no outer code, or vice-versa. Embodiments which utilize an RS, BCH or other similar type of error correcting outer code can of course use the code for error correction as well as for generation of an error flag.

It should also be noted that the TDM frame format shown in FIG. 4 is exemplary only, and should not be construed as limiting the invention to use with any specific type of TDM frame format, or TDM frame formats in general. The invention can be applied to decoding of a wide variety of other frame formats, including frequency division multiplexed (FDM) and code division multiplexed (CDM) formats, as well as combinations of TDM, FDM, CDM and other types of frame formats. Furthermore, although not described in detail herein, numerous different types of modulation techniques may be used in conjunction with the invention, including, e.g., single-carrier modulation in every channel, or multi-carrier modulation, e.g., orthogonal frequency division multiplexing (OFDM), in every channel. A given carrier can be modulated using any desired type of modulation technique, including, e.g., a technique such as m-QAM, m-PSK or trellis coded modulation.

As previously noted, the invention can be applied to the transmission of digital information other than audio, such as data, video, images and other types of information. Although the illustrative embodiments use audio packets, such as those generated by a PAC encoder, the invention is more generally applicable to digital information in any form and generated by any type of compression technique. The invention may be implemented in numerous applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of processing a plurality of programs for transmission in a communication system, the method comprising the steps of:

determining a value of a criticality measure for each of at least a subset of the programs; and allocating available bits to the programs based at least in part on the values of the criticality measures, such that a program with a criticality measure having a particular value in a designated time interval is allocated a different percentage of the available bits for that interval than another one of the programs with a criticality measure having a different value;

a given one of the programs comprising a stereo audio program having two or more audio channels.

2. The method of claim 1 wherein the plurality of programs comprises respective audio programs.

3. The method of claim 1 further including the steps of processing a bit allocation request for each of a plurality of encoders, wherein each of the encoders encodes a corresponding one of the programs, and generating an actual bit allocation for each of the plurality of encoders.

4. The method of claim 3 wherein the bit allocation request from a given one of the plurality of programs includes: (i) an actual bit demand for perceptual coding of audio information of the given program in a designated time interval; and (ii) a value of the criticality measure as determined for the designated time interval.

5. The method of claim 1 wherein the determining step includes determining a value of a criticality flag for each of the programs.

6. The method of claim 5 wherein at least one of the criticality flags is a single-bit criticality flag the value of which indicates the presence or absence of at least one of an onset and a transient in the corresponding program.

7. The method of claim 5 wherein at least one of the criticality flags is a linear criticality flag having a value characterizing a designated quality of the corresponding program.

8. The method of claim 7 wherein the linear criticality flag can take on one of at least three possible values, including a first value indicating stationary low-complexity audio, a second value indicating stationary higher-complexity audio, and a third value indicating presence of at least one of an onset or transient.

9. The method of claim 1 wherein the determining and allocating steps are repeated for each of a plurality of frames of information bits.

10. An apparatus for use in processing a plurality of programs for transmission in a communication system, the apparatus comprising:

a joint multiple program coder operative to determine a value of a criticality measure for each of at least a subset of the programs, and to allocate available bits to the programs based at least in part on the values of the criticality measures, such that a program with a criticality measure having a particular value in a designated time interval is allocated a different percentage of the available bits for that interval than another one of the programs with a criticality measure having a different value;

a given one of the programs comprising a stereo audio program having two or more audio channels.

11. The apparatus of claim 10 wherein the plurality of programs comprises respective audio programs.

12. The apparatus of claim 10 wherein the joint multiple program coder is further operative to process a bit allocation request for each of a plurality of encoders, wherein each of the encoders encodes a corresponding one of the programs, and to generate an actual bit allocation for each of the plurality of encoders.

13. The apparatus of claim 12 wherein the bit allocation request from a given one of the plurality of programs includes: (i) an actual bit demand for perceptual coding of audio information of the given program in a designated time interval; and (ii) a value of the criticality measure as determined for the designated time interval.

14. The apparatus of claim 10 wherein the joint multiple program encoder is further operative to determine a value of a criticality flag for each of the programs.

15. The apparatus of claim 14 wherein at least one of the criticality flags is a single-bit criticality flag the value of which indicates the presence or absence of at least one of an onset and a transient in the corresponding program.

16. The apparatus of claim 14 wherein at least one of the criticality flags is a linear criticality flag having a value characterizing a designated quality of the corresponding program.

17. The apparatus of claim 16 wherein the linear criticality flag can take on one of at least three possible values, including a first value indicating stationary low-complexity audio, a second value indicating stationary higher-complexity audio, and a third value indicating presence of at least one of an onset or transient.

18. The apparatus of claim 10 wherein the joint multiple program coder is further operative to repeat the determination and allocation operations for each of a plurality of frames of information bits.

19. A method of processing a plurality of programs for transmission in a communication system, the method comprising the step of:

allocating available bits to the programs based at least in part on corresponding criticality measures, such that a program with a particular criticality measure in a given time interval is allocated a greater percentage of the available bits for that interval than another one of the programs with a different criticality measure;

a given one of the programs comprising a stereo audio program having two or more audio channels.

20. An apparatus for use in processing a plurality of programs for transmission in a communication system, the apparatus comprising:

a joint multiple program coder operative to allocate available bits to the programs based at least in part on corresponding criticality measures, such that a program with a particular criticality measure in a given time interval is allocated a greater percentage of the available bits for that interval than another one of the programs with a different criticality measure;

a given one of the programs comprising a stereo audio program having two or more audio channels.

* * * * *